Patented July 2, 1940

2,206,190

UNITED STATES PATENT OFFICE 2,206,190

METHOD OF PICTORIAL CONTROL AND MATERIAL FOR USE THEREIN

Paul H. Jamieson, Redondo Beach, Calif.

No Drawing. Application September 27, 1937, Serial No. 165,926

7 Claims. (Cl. 95—88)

This disclosure relates to the art of pictorial control, as the expression is employed in the art of photographic reproduction, and pertains particularly to an improved method of pictorial control and to certain improved solutions useful in the practice of such method, such method being an improvement upon the method claimed in my issued Patent No. 2,108,261.

"Pictorial control," as known to photographers, consists in modifying all or a portion of a photographic register or image to obtain a resultant register which is more pleasing to the eye than the cold representation of the photographic subject obtained by the camera lens and the photographic emulsion. For example, in portraiture, the camera lens will pick up slight defects of which the eye itself might not be critical, and these defects are observable in a photographic print by reason of its inanimate nature. Furthermore, certain high-lights and shadows are picked up by the camera lens which may entirely alter the appearance of the subject, and which, if removed or modified, would materially improve the value of the portrait as a camera study. Photographers have, heretofore, by working on the photographic negative in what is known as an etching process, removed portions of the silver deposit by abrading the emulsion surface with a suitable implement to obtain a removal of high-lights and have reinforced certain other parts of the silver image by means of a retouching pencil to obtain the removal of shadows. This procedure is quite feasible where a relatively large negative is worked upon, but when a miniature negative is employed, the retouching operation is quite difficultly carried out by virtue of the fact that the detail of the negative is so small as to require the procedure to be practiced under a microscope or the like. As taught in my above-mentioned issued patent it has been found more convenient to obtain the desired pictorial control in an enlargement or print made from such a negative, by a controlled chemical conversion of the desired portions of the silver image, through the agency of certain preferred types of chemical solutions.

According to one phase of the disclosure in the above-mentioned patent, the pictorial control is effected by applying a suitable moisture-containing control medium to the photographic image, over the entire area to be worked upon, to obtain a partial hydration of the gelatine by providing a small amount of moisture without causing excessive swelling or softening. A non-aqueous solution of iodine or other suitable oxidizing agent is then applied to the partially hydrated emulsion at the areas where reduction of the density of the silver image is desired, to effect a chemical conversion of the metallic silver deposit into a salt of silver.

As is well known in the photographic art, a gelatine emulsion becomes increasingly susceptible to abrasion as the moisture content thereof increases, a fully hydrated emulsion being very susceptible to abrasion by contact with a solid substance. One of the principal objects of the present invention is to provide an improved method of practicing pictorial control on such an emulsion, in which a lubrication of the surface of such emulsion is obtained, and an aqueous control medium containing a dispersed lubricating agent adapted to provide such lubricating coating over the emulsion being worked upon, whereby a greater degree of hydration of the emulsion may be employed without danger of abrasion.

A further object of the invention is to provide a control medium having improved physical and chemical properties with respect to a photographic gelatine emulsion, and adapted to provide more uniform results from the application of the non-aqueous iodine-containing reagent with which the control medium is used.

A further object of the invention is to provide a control medium for the purpose described, such control medium being provided with a non-aqueous oleaginous constituent adapted to produce a non-aqueous film over a hydrated photographic surface on which the material is used, and serving to diminish evaporation of aqueous constituents of such photographic surface.

A further object of the invention is to provide a control medium of the character described, comprising a dispersion of an oleaginous liquid, which is adapted to produce a lubricated surface condition of the photographic surface upon which it is employed while at the same time producing a significant hydration of such emulsion, whereby successive applications of the non-aqueous iodine-containing reagent with which the control medium is employed may be made to the photographic surface without intervening applications of fresh portions of control medium, by the simple expedient of wiping away a vitiated portion of the non-aqueous iodine reagent with the finger-tip, instead of actually applying a fresh quantity of the control medium with a cotton swab as practiced heretofore.

The improved control medium of the present disclosure is, in its preferred aspect, an aqueous medium containing a dispersed or suspended material of a gelatinous nature adapted to exert a protective action upon the water-softened gelatine of the photographic surface on which the control medium is used. The improved medium preferably also contains certain water-miscible constituents having a solvent action on oleaginous liquids, together with an oleaginous substance in suspension or emulsified condition and adapted to act as a lubricant with respect to such water-softened or hydrated gelatine of the photographic surface.

The improved control medium preferably also contains a water-soluble compound adapted to react with elemental iodine in the production of an iodine compound which is substantially inert with respect to metallic silver, and preferably also contains one or more chemical compounds which have the property of causing the silver iodide (resulting from the reaction between elemental iodine and the silver deposit) to be converted into transparent state, thereby eliminating the clouding or masking effect of such formed silver iodide. The medium preferably also contains a water-soluble compound adapted to increase the solubility of elemental iodine in aqueous solution phase, such as a soluble alkali metal iodide, for example, potassium iodide. Such iodide may also be utilized as one of the compounds adapted to perform the function of "transparentizing" the silver iodide.

The control medium preferably also contains one or more non-aqueous solvent materials which will restrict the absorption of water by the gelatine in thhe photographic surface, and at least one of such agents is preferably one having a vapor pressure lower than that of water so that it will not evaporate from the hydrated gelatine of the photographic surface at a greater rate than the contained water, whereby the proportion of water in the photographic gelatine surface is prevented from increasing as a result of atmospheric evaporation over prolonged treatment periods during which successive applications of the control medium are made to such photographic surface.

The control medium preferably also contains one or more alkaline reagents adapted to establish the pH value of the medium definitely on the alkaline side, preferably at a pH of at least 7.5.

A typical composition of an operative formula of the improved control medium is as follows:

A {
Triethanolamine _____ 2¼ oz. (weight)
Isopropyl alcohol (98% preferred) _____ 50 oz. (vol.)
Tragacanth powder U. S. P. #1 _____ 2¼ lbs.
}

B {
Light petroleum oil* _____ 2½ lbs.
Aluminum stearate _____ 2¼ oz. (weight)
Octyl alcohol _____ 37½ oz. (vol.)
}

C {
Water _____ 4 gals.
"Carbitol" (diethyleneglycol-monoethylether) _____ 250 oz. (vol.)
}

D {
Isopropyl alcohol _____ 50 oz. (vol.)
Propylene glycol _____ 4 gals.
}

E {
Water _____ 100 oz. (vol.)
Trisodium phosphate _____ 800 grains
Sodium thiosulphate (hypo) ___ 11½ oz.
Potassium iodide _____ 4 lbs.
}

F {
Propylene glycol _____ 100 oz.
Boric acid _____ 4½ oz. (weight)
}

*The light petroleum oil is preferably one of medium viscosity, as more particularly brought out hereinafter, a typical example of a suitable oil being a so-called "medicinal oil," or an oil such as that obtainable on the market as "Union Oil Company's 'Red Line' Crystal oil."

The control medium is conveniently compounded by forming separate solutions of certain constituents, as indicated by the sub-divisions A through F in the above formula, which are intermixed in a certain preferred order. For example, mixture A, containing the triethanolamine, isopropyl alcohol, and gum tragacanth, comprises a physical mixture of the powdered gum in an alkaline alcoholic medium. The triethanolamine is useful as an emulsifying agent in the subsequent compounding of the control medium, and further imparts a portion of the alkalinity desired in the final composition. The isopropyl alcohol acts as a solvent for the oil in mixture B, furthering the subsequent emulsification, and being water-miscible, is subject to distribution between the oil and water phases of the emulsion. The gum tragacanth provides the gelatinuous cushioning agent upon the subsequent swelling thereof with water in a later step in the compounding.

The light petroleum oil is mixed with the aluminum stearate and octyl alcohol to form mixture B. This mixture is conveniently prepared by adding a small proportion of the oil to the aluminum stearate powder, stirring the same to a paste with the gradual addition of all the oil, which paste is then heated until a clear, jelly-like solution is obtained, after which the octyl alcohol is added while it is still warm, thinning the jelly-like consistency. In this mixture the aluminum stearate serves to materially increase the viscosity of the mineral oil, which improves its lubricating value with respect to the photographic surface on which the composition is used. The octyl alcohol is a relatively good solvent for both the oil and the stearate, and due to its solubility in the alcoholic-water mixture which constitutes the external phase of the emulsion, it serves to promote the stability of such emulsion.

Mixture A is added slowly to mixture B, during constant agitation of B, and the resulting mixture (A+B) appears to be a substantial solution of all the constituents with the exception of the gum tragacanth, which remains in suspension.

Mixture C, comprising "Carbitol" and water, is placed in a large agitator, and the mixture of A+B is added all at once to C, while maintaining effective agitation. Upon this addition, the gum tragacanth contained in the A+B mixture promptly absorbs water from the C mixture, which causes a marked swelling of the gum particles, and coincidently the principal proportion of the oil (carrying the aluminum stearate and at least a portion of the octyl alcohol) comes out of solution, forming small oil globules of a jelly-like consistency, which are immediately emulsified in the aqueous phase. The water-swollen gum particles assist in preserving the resulting emulsion of the oil globules in the aqueous phase, and the triethanolamine also assists in this emulsification. The resulting mixture (A+B+C) is a comparatively stiff emulsion, too stiff to flow readily. The "Carbitol" has some solvent action on the oil, and acts as a blending agent to increase the intersolubility of the water, alcohols, and the subsequently added glycol with respect to the hydrated gelatine structure.

The remaining constituents of the composition are combined into a single mixture for addition to the mixture of A+B+C, although they are first preferably separately combined as mixtures D, E, and F as a matter of convenience in compounding. For example, mixture E is prepared by dissolving the water-soluble constituents (in the order recited), mixture F comprises a solution of boric acid in a portion of the propylene glycol (in which it is readily soluble), and mixtures D, E, and F combined. Mixture D+E+F is then added to mixture A+B+C, a small amount at a time, under constant and thorough agitation. The D+E+F mixture, being only slightly aqueous, exerts a dehydrating action upon the water-swollen gum particles, decreasing the percentage or proportion of water in the aqueous phase of the emulsion. This results in the gum particles being shrunken or constricted into more compact particles, and, due to the active agitation, the particles are coincidently broken up into more finely divided particles, which remain suspended in the emulsion. Due to the diluent effect of the added D+E+F mixture, together with the constriction of the gum particles, the finished emulsion is much more fluid and is adapted to flow freely. (During the addition of the D+E+F mixture, should lumps appear, it is an indication that the mixture is being added too rapidly, and it is necessary to interrupt the addition of such mixture until the lumps have been broken down by the agitation.)

It will be appreciated that there is considerable latitude in the selection of the gum for use in the composition. As is well known, the water-soluble gums are characterized by a strong tendency to absorb water, with an attendant swelling into a gelatinous condition; the greater the water absorption, for a particular gum, the greater the swelling and the more gelatinous the particle. Various gums can be employed in the composition, the selection of the gum being dependent upon the proportion of water in the composition (with respect to non-aqueous constituents which tend to counteract or restrict the swelling which the water occasions). A gum such as acacia (gum arabic) has a comparatively high tolerance for non-aqueous materials, and is consequently useful in compositions having a low water content. Gum tragacanth is less tolerant of such non-aqueous materials, and requires a greater water content in the composition in order to acquire a softened condition. Cooked starch, although not a gum, may also be employed, but this material has a very low tolerance for non-aqueous materials, and while it is useful in compositions consisting substantially wholly of water, its utility in composite solutions is substantially nil. It is thus seen that control mediums of differing water contents will require the use of different gums or starchy materials, and it will be appreciated that the proportion of water will necessarily be so balanced (with respect to a particular gum) that the hardness of the gum particles will be lower than the hardness of the hydrated gelatine surface which is exposed to contact by the particles.

A control medium of limited utility may be prepared of water and cooked starch alone. For example, a 1% suspension of cooked starch in water is useful in connection with local bleaching, where a re-development of the image is desired, the starch serving the dual function of providing a lubricating agent which will mat into the cotton tuft or other applicator and provide some protection to the gelatine against abrasion, and at the same time acting as a reagent which will vitiate the residual iodine.

A unique property of gum tragacanth as a cushioning agent is that of maintaining its gelatinous cushioning nature in the presence of a lower concentration of water than will other materials such as starch, gelatine, or gum arabic. In the presence of alcoholic solvents starch tends to harden and become abrasive (being harder than the hydrated gelatine upon which it is used) and is without cushioning or emulsifying effect. On the other hand gum arabic will act as a thickener but does not maintain a jelly-like body and thus does not have a true cushioning effect upon the cotton applicator, although it does have some lubricating effect upon the hydrated gelatine by virtue of its thickening action.

The glycol has a limited softening action on gelatine and when the emulsified control medium is applied to a photographic gelatine surface the alcoholic glycol water mixture (constituting the external phase of the emulsified medium) will be absorbed by the gelatine structure, softening the gelatine structure and swelling it to some extent. As the aqueous and water-miscible constituents of the control medium penetrate the gelatine structure, the lubricating agent or oil will remain on the surface, in the form of small globules, and the swollen particles of gum also accumulate on the surface. As the control medium is spread over the surface of the gelatine structure by the use of a tuft of cotton or other suitable applicator, in accordance with the practice of the method of pictorial control as described in my copending application, the oil globules provide a physical lubrication of the surface of the gelatine structure and the gum particles are caught between and upon the fibers of the tuft of cotton and form an effective mat which shields the gelatine structure from the abrasive action of the cotton fibers. In this latter connection, it is advantageous to wet the cotton tuft with water (wringing out the excess moisture) before using the tuft to spread the control medium about the gelatine surface. A unique condition is produced by this procedure, due to the contact of the relatively wet cotton fibers with the constricted gum particles, which causes the gum particles to swell further and to attach themselves to the cotton fibers quite firmly, thereby increasing the matting action of such gum particles.

When a lubricating oil of the proper viscosity and solubility in the non-aqueous constituents of the control medium is incorporated in the mixture, the oil particles do not appear to attach themselves to the gelatine surface but appear to overlie this surface as a discontinuous protective film which is readily removed by washing the photographic print or negative in water but which appears to associate itself quite tenaciously with the hydrated gelatine structure during ordinary handling, thus preventing abrasion of the gelatine structure by contact with the fingers of the operator and at the same time serving to decrease the loss of control medium from the gelatine by evaporation.

Where a relatively soluble oil is employed, such as castor oil, the oil particles appear to "wet" the surface of the hydrated gelatine structure, probably due to the fact that some of the oil particles are caused to come out of solution in the control medium as the control medium penetrates the gelatine substance, and it is suspected that some of these oil particles actually deposit in the gelatine itself, in the production of a solid film of oil over a portion of the hydrated gelatine structure which, upon the subsequent application of further quantities of control medium, will spread over the surface of the gelatine structure in an irregular manner, causing an uneven swelling of the gelatine and interfering with the subsequent penetration of the non-aqueous iodine-containing solution which is employed in the process.

I preferably employ a mineral oil as a lubricating agent in view of its relative inertness with respect to the chemical agents employed in the control medium (such as sodium thiosulphate, etc.), although vegetable oils of low viscosity may advantageously be substituted, particularly where it is desired to make a medium for the purpose of controlling local bleaching of a photographic silver deposit where no dissolving or "transparentizing" of the formed silver iodide is desired, since the sodium thiosulphate and associated compounds could be eliminated from the formula.

The use of an excessive quantity of oil in the control medium, or the use of an oil or grease of a relatively high viscosity, apparently results in a coagulation or agglomeration of the oil particles on the surface of the gelatine structure, coating over the gelatine in a mottled fashion, which makes the subsequent application of the iodine-containing reagent very ununiform. The upper limit of viscosity of a mineral type of oil which may be employed is approximately that of "Vaseline," and this particular oil is, as a matter of fact, productive of a somewhat unstable emulsion which requires more than average dexterity on the part of the operator to obtain an even penetration of the control medium and iodine reagent. I therefore choose to employ, preferably, a liquid mineral oil having a viscosity somewhat less than that of "Vaseline." The upper limit of viscosity of a non-mineral type of oil (such as an animal or vegetable oil) is somewhat below the viscosity of castor oil, i. e., such an oil, to be useful, should have a viscosity somewhat less than that of castor oil. The utility of mixtures of various oils will be apparent.

As will be noted from the above formula, a considerable amount of a water-soluble iodide has been incorporated in the composition. The function of the iodide reagent is three-fold: (a) it serves to accelerate the chemical reaction between the iodine and the silver deposit; (b) it serves to decrease the effect of the iodide reaction products resulting from the vitiation of residual iodine as brought out under the discussion of the iodine-neutralizing action of the control medium; and (c) it cooperates with other reagents in the composition to "transparentize" the silver iodide formed in the iodine-silver reaction.

As pointed out in my above-mentioned copending application, the non-aqueous iodine-containing solution or reagent comprises a solution of iodine in oleaginous solvents and water- and oil-miscible solvents (i. e., solvents which have a mutual miscibility with respect to both water and oil), and with respect to function (a) above, it is my opinion that the chemical reaction between the iodine and the silver deposit within the hydrated gelatine structure is made possible, or at least facilitated, by a rather complicated physical transfer of the iodine from the non-aqueous solution phase to aqueous solution phase in the gelatine. It appears that the water- and oil-miscible iodine solvents present in the iodine solution tend to transfer or diffuse into the hydrated gelatine structure immediately upon contact of the iodine solution with such structure, carrying some iodine in solution. As a portion of the water- and oil-miscible solvent constituents is withdrawn from the non-aqueous iodine solution, the solubility tolerance of the remaining liquid constituents of the solution, with respect to iodine, is materially lowered, tending to drive iodine out of solution, which iodine preferably escapes from the non-aqueous solution with the escaping water- and oil-miscible constituents. As above pointed out, the use of a lubricated control medium makes it possible to employ a greater degree of hydration of the gelatine structure without danger of abrasion, and this increased hydration facilitates or accentuates the transfer of the water- and oil-miscible constituents from the iodine solution. Actually, the use of a more highly hydrated gelatin structure results in a more complete withdrawal of non-oleaginous constituents from the non-aqueous iodine solution during the period in which the non-aqueous iodine solution is in contact with the hydrated gelatine, which in turn results in producing greater immiscibility between the residual (practically wholly oleaginous) iodine-containing solution and the hydrated gelatine whereby such residual iodine-containing solution is rendered substantially inert with respect to the silver deposit in a relatively short time of contact. The rate of transfer of iodine from the non-aqueous solution into the hydrated gelatine structure is thus seen to be increased by the use of the present described control medium and in order to take advantage of this more rapid transfer of iodine, I preferably employ the above-mentioned soluble iodide in the control medium so that the hydrated gelatine structure will have a greater tolerance for iodine (due to the increased aqueous solubility of iodine in the presence of a soluble iodide), wherefore a more rapid reaction is secured between the transferred iodine and the silver deposit.

Factors (b) and (c) are associated with the effect of the iodine neutralizing agents (such as sodium thiosulphate, tri-sodium phosphate, sodium sulphite, etc.), factor (b) being associated with all of the above agents, while factor (c) is primarily associated with but sodium thiosulphate. The iodine neutralizing agent is one which will react with iodine in aqueous solution phase, in the production of a compound substantialy inert with respect to metallic silver, wherefore, as brought out in the above-mentioned copending application, residual iodine remaining after an application of the non-aqueous iodine-containing reagent may be effectively vitiated prior to the addition of a fresh portion of such reagent. The vitiating reaction results in the formation of an iodide, which, if water-soluble, will act both as a swelling agent for the gelatine, and as an accelerator in a subsequent reaction between iodine and the silver deposit. The vitiating reaction of the above-named iodine neutralizing agents results in the formation of sodium iodide, which has somewhat the same effect as the soluble iodide referred to in the preceding paragraph, increasing the solubility of elemental iodine in the aqueous phase within the gelatine structure. Where a relatively large amount of a soluble iodide is provided in the control medium, however, the percentage increase in iodide content of the aqueous phase of the gelatine structure is low in comparison with the percentage increase which would result from the formation of the reaction-product iodide in the absence of the added iodide. According to the present teaching, therefore, the added iodide provides a masking of the effect of the reaction-product iodide, or serves to make such effect insignificant.

The effect of the added iodide on the "transparentizing" of the formed silver iodide, factor (c), appears to be definitely associated with the action of the sodium thiosulphate present in the control medium. When the iodine of the non-aqueous iodine reagent reacts with the metallic silver of the photographic deposit, the silver is converted into a light-colored, opaque form of silver iodide, which normally acts to mask the underlying metallic silver grains, and make it appear that a great deal more bleaching has taken place than is actually the case. When the photographic subject is subsequently "fixed" in a hypo solution, the silver iodide is dissolved, and the untreated silver grains unmasked. In order to avoid such masking of the silver grains, I have heretofore employed a reagent having a strong solvent action on the formed silver iodide wherefore a substantially continuous removal of the silver iodide is obtained. Sodium thiosulphate has some direct solvent action, and as taught in my aforesaid issued patent, a rather large quantity of this agent was incorporated in the control medium, together with a stronger solvent, namely, thiourea. It has been found more advantageous to cause the silver iodide to be formed in a transparent state, or to be "transparentized" after its formation, or both. The added soluble iodide, together with the sodium thiosulphate, serves to cause the desired "transparentizing," although the "transparentizing" effect of either of these two reagents, taken alone, is quite nominal.

The proportion of thiosulphate and iodide, however, should be kept at a low value due to the tendency of each of these reagents to react directly with the metallic silver deposit. The direct action of these two agents upon silver is decreased to an allowable value (with the proportions given) by maintaining the control medium on the alkaline side, as by means of the added alkaline compounds (triethanolamine, trisodium phosphate, and sodium sulphite).

The sodium sulphite is incorporated in the formula as a preservative for the sodium thiosulphate, although its use is not essential to the production of an operative medium.

The boric acid is employed as a buffer for the alkaline constituents, to keep the pH value of the solution within the desired range, and in view of the fact that boric acid is substantially inactive with respect to all the chemical reactions involved in the pictorial control procedure, its liberation by the production of acidic reaction products in such reactions is not harmful to the process.

One of the particular attributes of the present control medium is that of increasing the speed of reaction of the applied iodine solution, and as a correlated feature the control medium is found to exert a pronounced stopping action on the iodine-silver reaction after it has progressed to a certain extent. According to the practice of the method of pictorial control set forth in my above-mentioned issued patent, it was necessary to apply the iodine-containing reagent to the partially hydrated gelatine structure, allow it to remain in contact therewith for a definite period, and to then apply a further quantity of the control medium to that area (with a tuft of cotton or other applicator) in order to stop the iodine-silver reaction before it had progressed too far. The reason for this procedure was that the reaction between the iodine (in the aqueous phase within the gelatine structure) and the silver deposit was comparatively slow and prolonged, wherefore it was necessary to stop the reaction by applying a vitiating reagent (contained in the control medium). With the employment of increased hydration of the gelatine structure according to the present disclosure, the extent of reaction of the iodine reagent upon the silver deposit may be controlled wholly by the concentration of iodine in the iodine reagent, the transfer of iodine from the non-aqueous reagent into the gelatine being controlled primarily by the tendency of the oil- and water-miscible constituents of the iodine reagent to transfer into the hydrated gelatine, as above brought out. As the oil- and water-miscible constituents are withdrawn from the iodine reagent by direct absorption into the hydrated gelatine structure, the residual non-aqueous iodine solution becomes more and more immiscible with water, and at the end of the effective transfer of iodine into the gelatine structure the residual non-aqueous iodine solution is substantially inert with respect to the silver in such gelatine structure at the point of application, and is even more inert with respect to the silver in the gelatine structure at the areas surrounding the point of application. For this reason it is unnecessary to apply a fresh portion of control medium to the area under treatment in order to stop the reaction, and the gelatine surface may merely be wiped with the finger for the purpose of removing the supernatant residual iodine solution and thus expose the photographic image to visual inspection to determine whether a subsequent application of fresh iodine reagent is desired. Several successive applications of iodine reagent may be made in this manner, without fresh application of control medium to the surface. It will be appreciated that a small amount of control medium will be wiped from an adjacent area by the finger as the residual iodine reagent is being removed, but this quantity of fresh control medium is quite nominal and may serve merely to neutralize the very slight quantity of iodine remaining unreacted in the upper layer of the gelatine structure.

The above-described method of applying the successive quantities of iodine reagent to the area under treatment is not practical where extremely dense deposits of metallic silver are to be reduced in density, in view of the fact that such reduction is more practicably secured where a rather concentrated iodine reagent is employed, inasmuch as the automatic stopping action is less pronounced with strong concentrations of iodine reagent. In general, however, such method may be utilized from 50% to 90% of the time, depending upon the individual preference of the technician.

It will be appreciated that the provision of increased hydration of the gelatine structure makes possible a quantitative control of the quantity of iodine which reaches the silver deposit, i. e., a quantitative control of the amount of iodine which reaches the sphere of reaction with the silver deposit, wherefore a quantitative control of the extent of reaction between the applied portion of iodine-containing reagent and the silver deposit may be exercised. This quantitative control is a result of the higher rate of transfer of iodine into the aqueous solution phase made possible by the greater hydration of the gelatine, as above brought out, taken with the greater tolerance of such gelatine for elemental iodine made possible by the presence of the alkali iodide, and the higher rate of automatic stopping of the transfer of iodine to the gelatine as the applied non-aqueous iodine solution is rendered more and more immiscible with the aqueous phase of the gelatine structure. Taking a reasonable reaction time as a constant factor, it will be seen that the extent of bleaching to be obtained by a single application of the non-aqueous iodine-containing reagent may be controlled by the iodine concentration in the applied reagent.

In order to control the quantity of iodine which is available for transfer into the hydrated gelatine, I preferably employ a modified type of thinner of the type described and claimed in the aforesaid copending application, in accordance with the teachings therein, but due to the presence of "Carbitol" in that composition, a slight physical dehydration of the gelatine structure is brought into play which results in a physical stopping action of the iodine-silver reaction by a physical constriction of the gelatine structure. A modified form of thinner, consisting of substantially equal parts of a light mineral oil and octyl alcohol may be employed where such physical constriction is not desired, such a thinner serving to dilute the iodine reagent and thus decrease the iodine content thereof, and at the same time (due to the higher proportion of mineral oil present) resulting in a lowered tolerance for the non-oleaginous constituents of the reagent so that there is a greater tendency for such constituents to leave the oleaginous phase and enter the aqueous phase of the hydrated gelatine, carrying therewith the necessary iodine for the bleaching reaction. The actual speed of reaction is not affected materially, however, due to the increased viscosity of the iodine reagent resulting from the use of a light mineral oil (such as the above-mentioned "Crystal oil"). Furthermore, in contrast to the thinner described in my copending application. the oil-alcohol thinner exerts no physical stopping action by constriction of the gelatine. The octyl alcohol serves as a mutual solvent for all the constituents of the non-aqueous iodine reagent, and has no significant effect upon the hydration of the gelatine, wherefore a deeper penetration of the iodine into the gelatine structure is made possible when used in connection with the improved control medium herein described.

Considerable modification may be made to the preferred formula of control medium given above, as will be apparent to one skilled in the art, in accordance with the teachings herein. The proportion of oil in the formula may be materially increased, for example, in order to increase the lubricating effect, without affecting the smoothness of application of the iodine reagent. A modified formula, showing somewhat different proportions of constituents, and subject to a modified compounding procedure, is given below as a further example of an operative composition:

A' {
Red Line Crystal oil__1 oz. (vol.) (heavy grade)
Aluminum stearate__10 grains (heat)
Octyl alcohol_____4 drams
Isopropyl alcohol____4 drams (add slowly while stirring)
Tragacanth powder U. S. P. #1_____100 grains
}

B' {
Carbitol_____1½ oz. (vol.)
Triethanolamine_____10 grains
Water_____5 oz.
Isopropyl alcohol____1 oz.
}

C' {
(Dissolve in the order given)
Water_____1 oz.
Tri-sodium phosphate_____8 grains
Sodium sulphite_____3 grains
Sodium thiosulphate_55 grains
Potassium iodide____280 grains
Propylene glycol____7 oz. (vol.)
Boric acid_____11 grains
}

The above formula may be compounded by forming the three separate mixtures A', B', and C', mixing B' with A' all at once, under agitation, and adding C' to the mixture of A'+B', a small quantity at a time, under constant agitation, in a manner comparable to the above-described manner of adding D+E+F to A+B+C.

As is above brought out, the control medium of the present invention consists essentially of an aqueous liquid (i. e., a liquid consisting wholly or in part of water) and a lubricating agent dispersed in such liquid. The lubricating agent is dispersed as physical particles of a gelatinous or oleaginous nature which serve to form a discontinuous lubricating coating on the gelatine emulsion surface when applied in use, and these lubricating particles (which may comprise particles of a gum, starch, or globules of an oleaginous material) are necessarily of finite size, as distinguished from a molecular dispersion, in order to form this discontinuous lubricating coating. This dispersed material is designated in the appended claims as comprising a dispersed phase, or as dispersed in the aqueous mixture as a separate phase, by which it is intended to distinguish from simple solution of such lubricating agent.

I claim:

1. In the method of photographic pictorial control of a photographic silver deposit in a partially hydrated gelatine emulsion by oxidation of such deposit to a salt of silver through the agency of elemental iodine, the steps which comprise: conditioning said gelatine emulsion by applying to the surface thereof an aqueous mixture containing a lubricating agent dispersed therein as a separate phase, to cause an at least partial hydration of said gelatine emulsion and form a discontinuous protective coating of such lubricating agent over the surface of said emulsion, and subsequently applying elemental iodine to such partially hydrated surface.

2. In the method of photographic pictorial control of a photographic silver deposit in a partially hydrated gelatine emulsion by oxidation of such deposit to a salt of silver through the agency of elemental iodine, the steps which comprise: conditioning said gelatine emulsion by applying to the surface thereof an aqueous mixture containing a plurality of finely divided gelatinous particles dispersed therein as a separate phase, to cause an at least partial hydration of said gelatine emulsion and form a discontinuous protective and lubricating coating of such gelatinous particles over the surface of said emulsion, and subsequently applying elemental iodine to such partially hydrated surface.

3. A photographic pictorial control solution for use on a photographic surface provided with an emulsion comprising gelatine and a metallic deposit of silver or the like, to effect a partial hydration of such gelatine and at the same time provide a discontinuous protective and lubricating coating over the surface of said gelatine-containing emulsion, which comprises: an aqueous mixture of water and an alcoholic liquid having a vapor pressure lower than that of water, and constituting an external emulsion phase; an oleaginous liquid dispersed in said aqueous mixture and constituting an internal emulsion phase; and a plurality of finely divided gelatinous particles dispersed in the resulting emulsion as a separate phase.

4. A photographic pictorial control solution for use on a photographic surface provided with an emulsion comprising gelatine and a metallic deposit of silver or the like, which comprises: an aqueous mixture of water and an alcoholic liquid having a vapor pressure lower than that of water; an oleaginous liquid emulsified in said mixture; a water-soluble compound in solution in said mixture, said compound being adapted to react with elemental iodine in the formation of a compound chemically inactive with respect to metallic silver, and an alkali metal iodide in solution in said mixture.

5. The control solution set forth in claim 4, and comprising in addition, sodium thiosulphate in solution in said mixture.

6. The control solution set forth in claim 4, and comprising in addition, alkaline agents establishing the pH value of said solution definitely on the alkaline side.

7. The control solution set forth in claim 4, and comprising in addition, sodium thiosulphate in solution in said mixture, and an alkaline agent establishing the pH value of said solution definitely on the alkaline side.

PAUL H. JAMIESON.